(12) United States Patent
Giordano et al.

(10) Patent No.: US 6,366,662 B1
(45) Date of Patent: Apr. 2, 2002

(54) SYSTEM AND METHOD FOR ALTERNATIVE ROUTING OF SUBSCRIBER CALLS

(75) Inventors: Glenn A. Giordano, Allen; Martin P. J. Cornes, Plano; Robert E. Montgomery, Carrollton; Christopher J. Koath, Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/016,106

(22) Filed: Jan. 30, 1998

(51) Int. Cl.[7] .............................. H04M 7/00; H04M 3/08; H04M 7/14; H04J 3/14
(52) U.S. Cl. .................... 379/221; 370/217; 379/268; 379/269; 379/273; 379/279
(58) Field of Search .................... 379/219, 220, 379/221, 268, 269, 273, 279, 284; 370/217

(56) References Cited

U.S. PATENT DOCUMENTS

| 4,402,074 | 8/1983 | Cupuis et al. . |
| 4,972,465 | * 11/1990 | Cline et al. ................... 379/221 X |
| 5,177,735 | 1/1993 | Blaszykowski et al. . |
| 5,301,050 | 4/1994 | Czerwiec et al. . |
| 5,315,594 | 5/1994 | Noser . |
| 5,365,518 | 11/1994 | Noser . |
| 5,418,776 | 5/1995 | Purkey et al. ................... 379/284 X |

FOREIGN PATENT DOCUMENTS

| 0 399 723 | 11/1990 | (EP) . |
| 97/48224 | 12/1997 | (WO) . |

OTHER PUBLICATIONS

R.A. Billhardt, et al., "A Survey of the Remote Switching Capabilities of the 5ESS[1] Switch", Proceedings of the IEEE Int'l Conference on Communications, Jun. 22–25 1986, pp. 1105–1110.

T. Kilm, et al., "Fexibility and Quality in the Access Network", Proceedings of the Supercomm/Int'l Conference on Communications, Jun. 14–18, 1992, vol. 4, pp. 1864–1868.

* cited by examiner

Primary Examiner—Harry S. Hong
(74) Attorney, Agent, or Firm—Fish & Richardson, P.C.

(57) ABSTRACT

A method of switching subscriber calls is disclosed that includes receiving a subscriber call request on an access terminal, determining whether the access terminal is in communication with a telecommunications network and routing the subscriber call request through alternate telecommunications equipment if the access terminal is not in communication with the telecommunications network.

21 Claims, 6 Drawing Sheets

SYSTEM AND METHOD FOR ALTERNATIVE ROUTING OF SUBSCRIBER CALLS

BACKGROUND

This invention relates to telecommunications terminals. Particularly the invention involves an access terminal.

Telecommunications terminals connect subscriber lines, such as POTS (Plain Old Telephone Service) and ISDN (Integrated Services Digital Network) lines, to telecommunications equipment such as a telecommunications switch, e.g., a class 5 switch. Telecommunications switches connect and route messages between different lines.

A telecommunications terminal contains channel unit card slots that accept channel unit cards. Channel unit cards convert analog and digital signals from subscriber lines into formatted digital data signals. Different types of channel unit cards service different types of subscriber lines (e.g. POTS or ISDN). The terminal constructs one or more time division multiplexed (TDM) signals from several channel unit cards' formatted digital data signals for transmission to remote telecommunications equipment for example, another telecommunications terminal. The terminal also demultiplexes TDM signals received from remote telecommunications equipment to deliver formatted digital data back to the channel unit cards. Channel unit cards convert the formatted digital data into a form suitable for transmission over subscriber lines.

Two telecommunications terminals can be connected "back-to-back" to form a digital loop carrier (DLC) network. A DLC typically includes a remote terminal (RT) placed near a business or residence and a central terminal (CT) placed in a central exchange connected to a telecommunications switch. The RT and CT communicate over a single or multiple lines carrying TDM signals. This configuration connects subscribers to the telecommunications switch via the DLC network.

A digital loop carrier (DLC) at a central terminal (CT) includes a multiplexor which, using TDM, can multiplex multiple analog and digital signals from subscriber telephone lines into a single or multiple T1 signal. A mirror DLC located at a remote terminal (RT) can decode the multiplexed T1 signal into a form suitable for transmission over subscriber telephone lines. This data flow also occurs in the opposite direction from RT to CT.

SUMMARY

A method of switching subscriber calls includes receiving a subscriber call on an access terminal, determining whether the access terminal is in communication with a telecommunications network and routing the subscriber call through alternate telecommunications equipment if the access terminal is not in communication with the telecommunications network.

The method may also include determining whether the subscriber call request is to another subscriber connected to the access terminal and switching the subscriber call request within the access terminal to another subscriber connected to the access terminal. The routing may include switching the subscriber call through alternate telecommunications equipment to another access terminal which may also not be in communication with the telecommunications network during the routing of the subscriber call. The method may include routing the subscriber call from another access terminal to the telecommunications network.

The access terminal may be a remote terminal and the other access terminal may be a central office terminal. If the access terminal is not in communication with the controller, the access terminal indicates that service is not available to subscriber call requests not to other subscribers connected to the access terminal, if the access terminal is not in communication with the controller.

Also, the method may include recording subscriber calls and call attempts while the access terminal is not in communication with the telecommunications network. At least some central office functionality may be provided while the access terminal is not in communication with the telecommunications network, possibly by a resource card with a digital signal processor.

A telecommunications network has a digital loop carrier including access terminals coupled to a switching network. A controller connected to the access terminals is included. Also, a processor is provided in at least one of the access terminals for routing subscriber call requests to other subscribers on the same access terminal, routing subscriber call through the switching network when the communication link between the access terminal and the switching network is functioning and routing subscriber calls to alternate telecommunications equipment when the communication link between the access terminal and the switching network is malfunctioning.

The processor may indicate that service is not available to subscriber call requests not to other subscribers connected to the access terminal when the communication link between the access terminal and the controller or switching network is malfunctioning, record subscriber calls and call attempts while the communication link between the access terminal and the controller or switching network is malfunctioning and provide at least some central office functionality while the communication link between the access terminal and the switching network is malfunctioning.

Software, residing on a computer-readable medium, for an access terminal in a telecommunications network including access terminals coupled to a switching network and a controller connected to the access terminals is provided. The software includes instructions to cause one or more processors to route subscriber calls within the access terminal to other subscribers connected to the access terminal, determine whether a communications link between the access terminal and the switching network is malfunctioning and route subscriber calls to alternative telecommunications equipment when the communications link between the access terminal and the switching network is determined to be malfunctioning.

The software may include instructions to determine whether a communications link between the access terminal and the controller or switching network is malfunctioning and indicate that service is not available to subscriber call requests not to other subscribers connected to the access terminal when the communication link between the access terminal and the controller or switching network is determined to be malfunctioning.

The software may include instructions to record subscriber calls and call attempts while the communication link between the access terminal and the switching network is malfunctioning and instructions to provide at least some central office functionality while the communication link between the access terminal and the controller or switching network is malfunctioning.

Advantages may include one or more of the following. Switching of local calls is handled by a remote terminal receiving the calls. As a result, local subscriber calls always will be completed even if a remote terminal is isolated from its network. Also, if a remote terminal is severed from its central office terminal, calls can be completed by routing them through alternative telecommunication equipment. Other advantages will become apparent from the following description including the drawings and claims.

DETAILED DESCRIPTION

Figure 1:
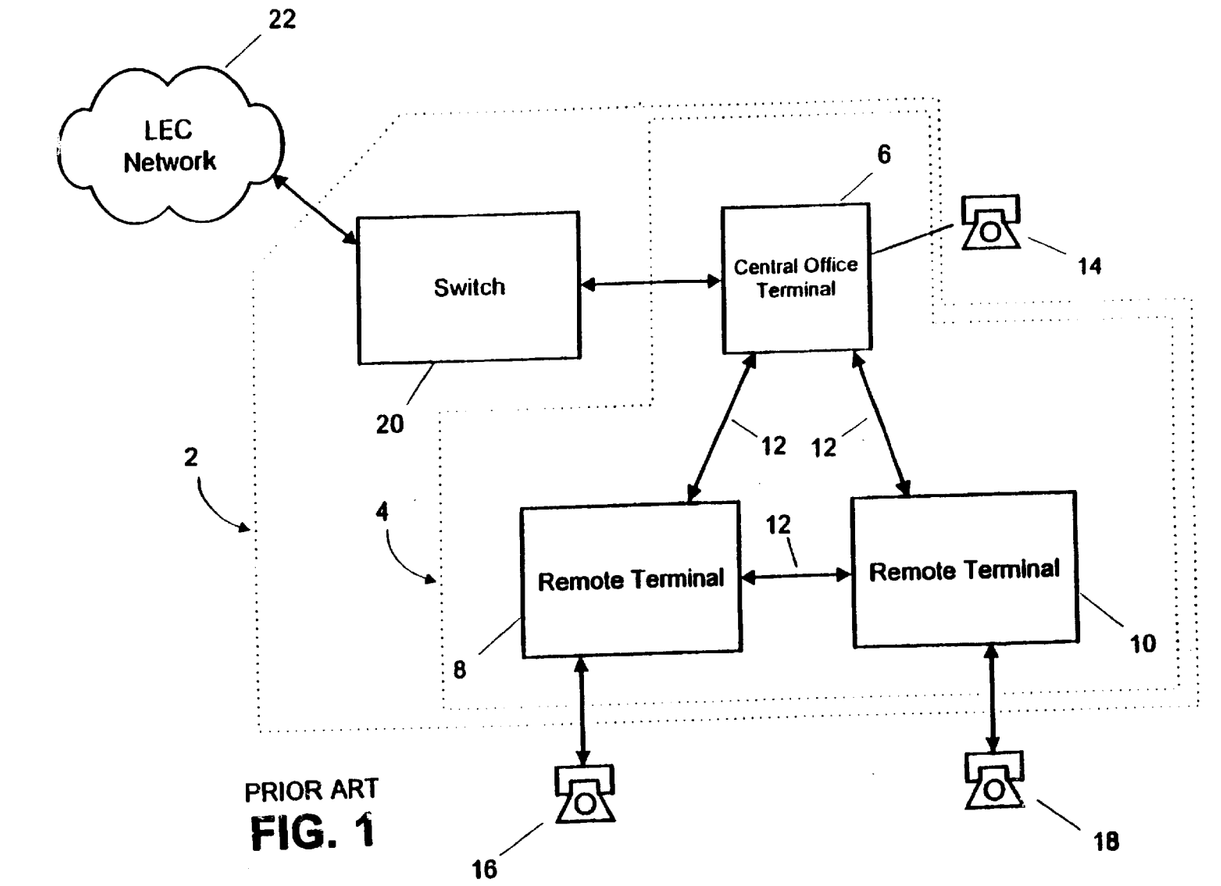
FIGS. 1 and 2 is a diagram of a telecommunications system.

As shown in FIG. 1, a telecommunications system 2 includes a digital loop carrier (DLC) 4. The DLC 4 includes a central office terminal (CT) 6 coupled to one or more remote terminals (RT) 8, 10 via metallic, fiber or other suitable communication media 12. DLC 4 performs call control and management signals and provides central office call processing functions. Subscriber devices, such as telephone service equipment 14, 16, 18, can be coupled to the central office terminal 6 and to the remote terminals 8, 10, respectively. The central office terminal 6 also is coupled to a local exchange carrier (LEC) network 22. The central office terminal 6 may be coupled to the LEC network 22 through a switch 20, such as a class 5 switch.

In this configuration, switching is accomplished within switch 20. Calls from the remote terminals are sent to the central office terminal 6, which in turn sends the calls to the switch 20 to be switched.

Figure 2:
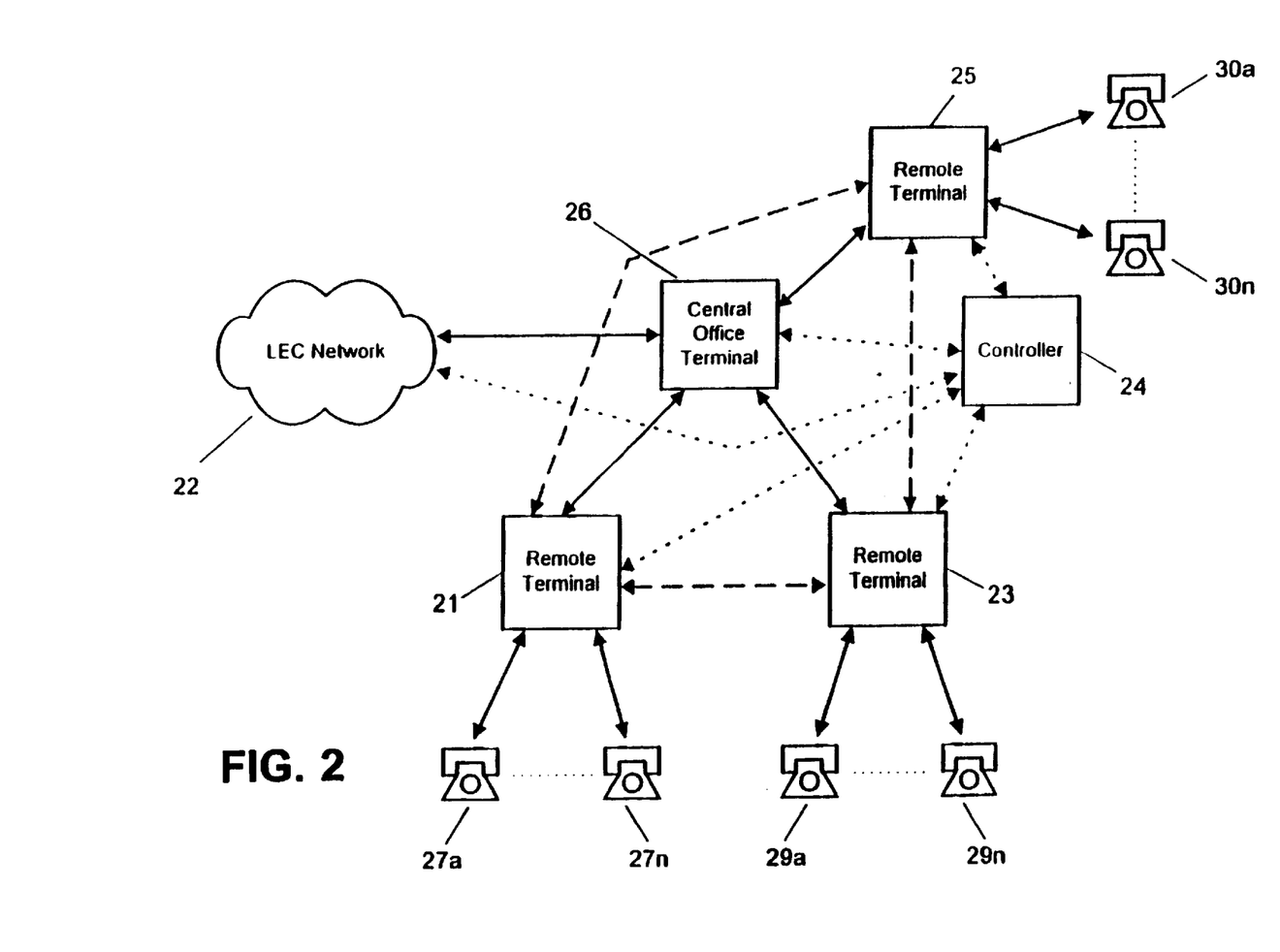

FIG. 2 shows a telecommunications system in which the remote terminals 21, 23 and 25 are connected individually to central office terminal 26 and connected to one another in a networked configuration. The remote terminals 21, 23 and 25 also may be connected together in a networked configuration with only one remote terminal connected to the central office terminal 26 or connected together individually to central office terminal 26 without being networked together. Alternatively, any of the above configuration could be implemented with remote terminals 21, 23 and 25 connected directly to the LEC network 22 as opposed to central office terminal 26. These last alternatives eliminate the need for a central office terminal 26 and require that the protocol of remote terminals 21, 23 and 25 match that of the LEC network 22. In any configuration, all of the remote terminals 21, 23 and 25 are connected to a controller 24 that handles routing, billing and system management. Subscribers 27a–n, 29a–n and 30a–n are connected to remote terminals 21, 23 and 25 respectively. In general, the remote terminals are connected to a type of switching network.

In FIG. 1, when the communication media between the central office terminal 6 and a remote terminal 8 or 10 is severed, the remote terminal will detect the loss of transport. This is accomplished by detecting a loss of signal, an alarm condition or an excessively high error rate. If the remote terminal becomes isolated from central office terminal 6 and service is terminated in the area serviced by that remote terminal. This is because the remote terminal relies on the switch to complete calls.

However, in FIG. 2, each remote terminal can be configured to have local switching capabilities. Thus, if the connection between one of the remote terminals 21, 23 or 25 and to the central office terminal 26 becomes severed, the remote terminals nevertheless are able to complete calls to any of the subscribers connected to any of the remote terminals 21, 23 or 25 that are still interconnected. Remote terminals having such local switching capabilities switch local subscribers among one another without involving other devices or terminals.

Figure 3:
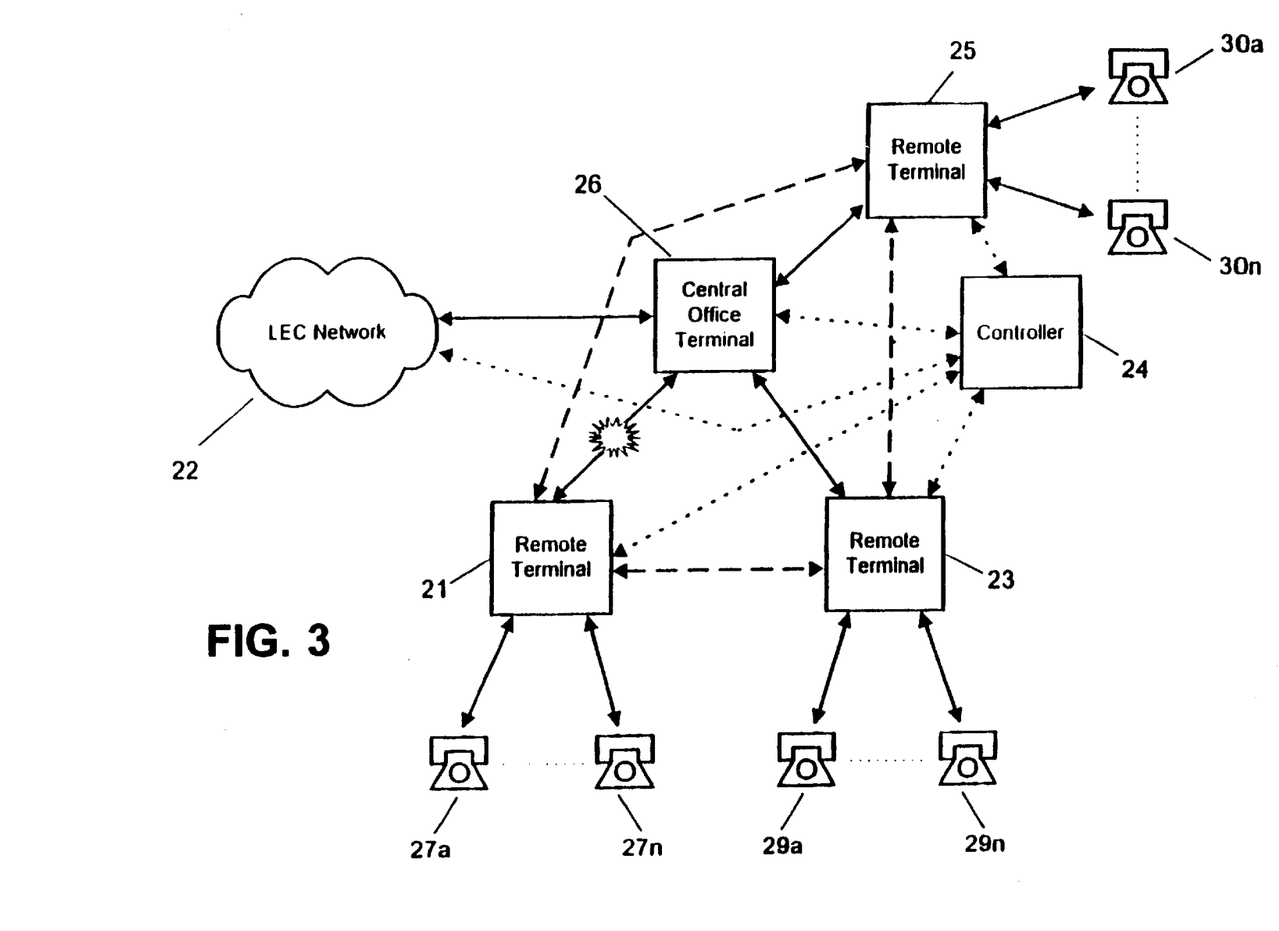
FIG. 3 is a diagram of a telecommunications system with a remote terminal severed from a central terminal.

FIG. 3 shows the resulting configuration if the connection from remote terminal 21 to central office terminal 26 becomes severed. When such an interruption of service occurs switching is performed on remote terminal 21 using the controller to route calls through the network connections of either remote terminal 23 or 25. As a result, subscribers 27a–n are able to reach any subscribers connected to remote terminals 21, 23 or 25. Also, because remote terminals 23 and 25 still have access to central office terminal 26 even though remote terminal 21 has become disconnected, subscribers 27a–n can be routed through terminals 23 or 24 to reach network 22.

Figure 4:
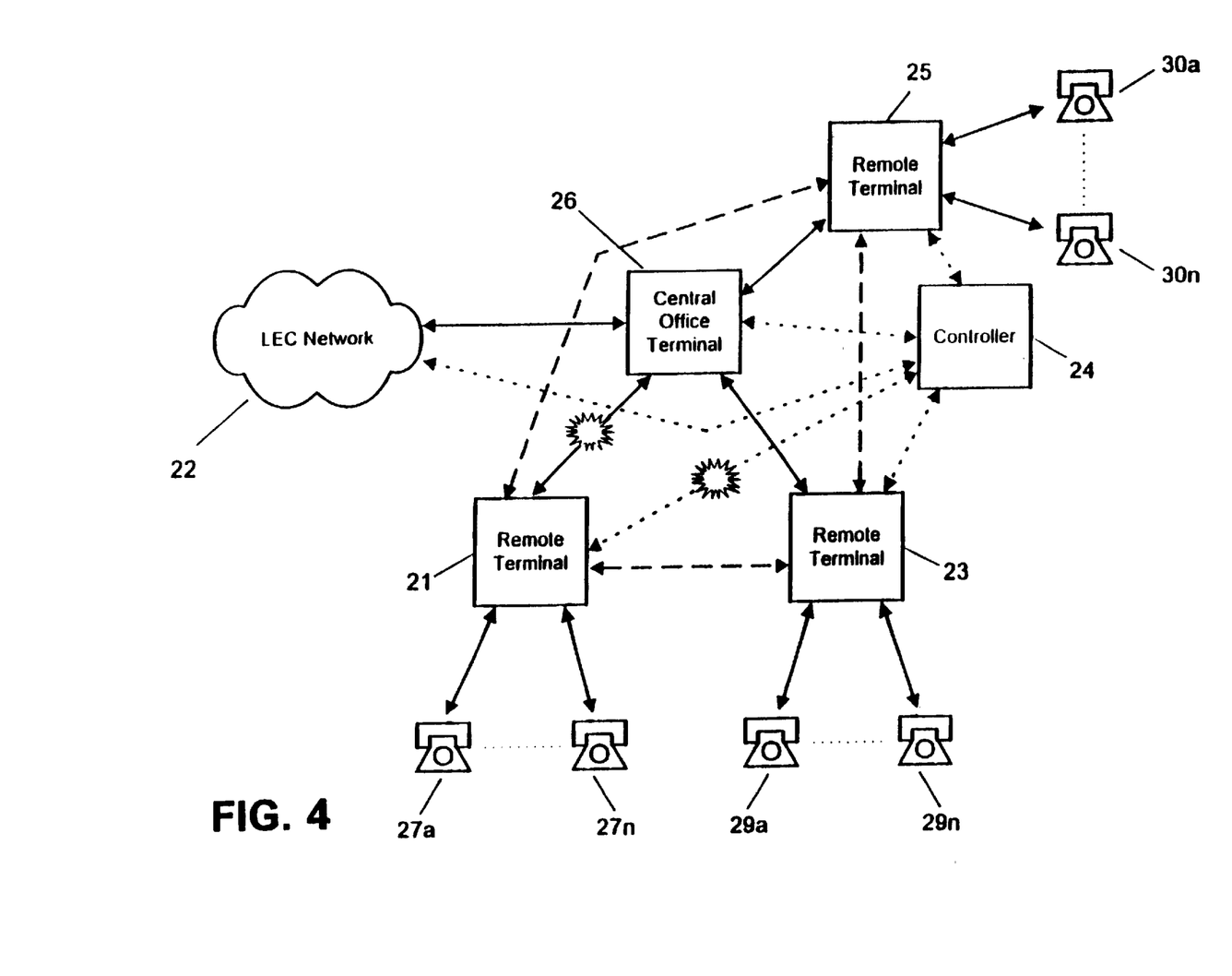
FIG. 4 is a diagram of a telecommunications system with an isolated remote terminal.

If both the connection to the central office terminal 26 and the connection to the controller 25 become severed as shown in FIG. 4, remote terminal 21 is completely isolated from the rest of the network. However, remote terminal 21 can be configured to provide local switching capabilities among its connected subscribers. As a result, subscribers 27a–n continue to have access to local dialing within remote terminal 21 and thus can reach any other of subscribers 27a–n.

Figure 5:
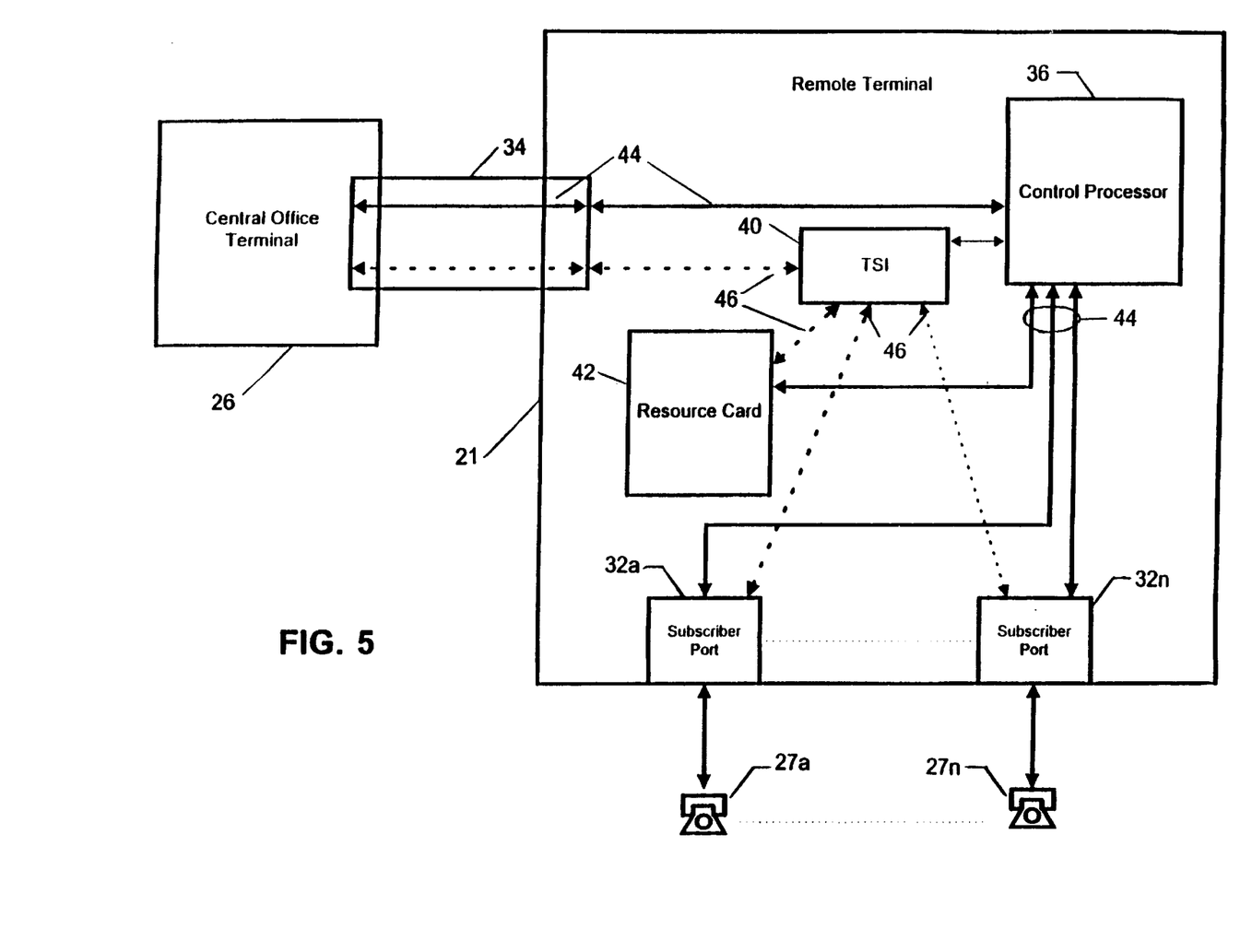
FIG. 5 is a block diagram of the components of an embodiment of the present invention.

A block diagram of the general components of a remote terminal 21 configured to provide local switching services is shown in FIG. 5. Subscribers 27a–n are connected through subscriber ports 32a–n which connect to control processor 36. Control processor 36 is coupled to time slot interchanger (TSI) 40 and a resource card 42. In the configuration shown in FIG. 5, local switching capabilities are provided by reconfiguring the TSI 40 and providing a resource card 42. TSI 40 is reconfigured to perform in a dynamic fashion as opposed to a static fashion. In a static configuration provisioning information set by the user defines the connections of the terminal's switching matrix. In a dynamic configuration, however, software residing on TSI 40 will make or break connections of the switching matrix as required.

A resource card 42 also is used in FIG. 5 to achieve local switching capabilities by providing call resources, such as dial tone generation, digit collection, etc. Such call resources ordinarily would be provided to a remote terminal by a telecommunications switch, but because, in this case, remote terminal is serving as the switch, the appropriate call resources must be generated by the terminal itself. The resource card 42 includes a digital signal processor, memory and an application specific integrated circuit (ASIC) that are used in providing call resources. Also, applications such as recording calls and call attempts while the system is isolated from the controller, the network or both is provided.

Figure 6:
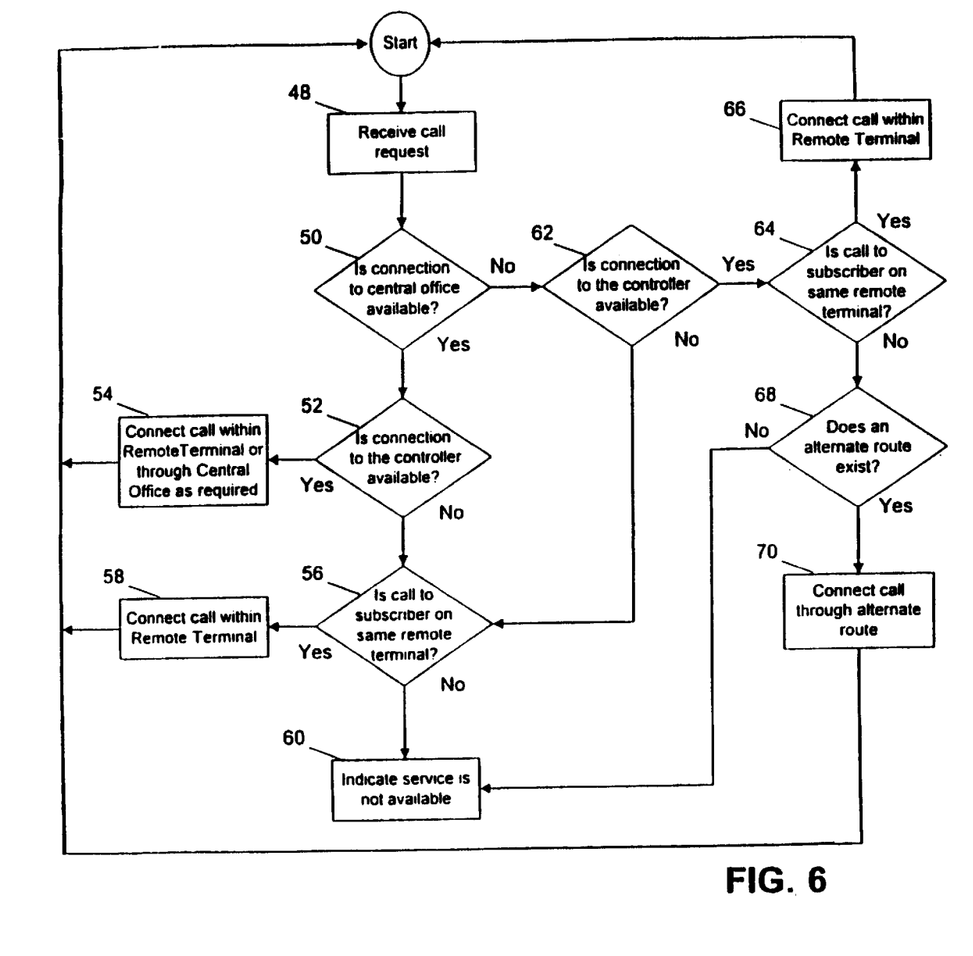
FIG. 6 is a flow chart of the operation of a telecommunications system.

FIG. 6 shows the operation of remote terminal 21 configured to provide local switching capabilities. First, remote terminal 21 receives a call request from a subscriber 27a–n (step 48). Then, remote terminal 21 determines if the connection to the central office terminal 26 is available (step 50). If so, the remote terminal 21 determines if the connection to controller 24 is available (steps 52). When both the connections to central office terminal 26 and controller 24 are available operation is normal. Call requests are connected within remote terminal 21, if the call request is to another subscriber 27a–n, or to central office terminal 26 (step 54).

If, however, the connection to controller 24 is not available (step 52) the remote terminal 21 will determine whether the call request is to another local subscriber 27a–n connected to remote terminal 21 (step 56). Call requests to other local subscriber 27a–n can be completed within remote terminal 21 (step 58). The terminal indicates to the subscriber that the call request cannot be completed, i.e., service is unavailable, if the call request is not to another local subscriber 27a–n.

If the connection to central office terminal 26 is determined to be unavailable (step 50), remote terminal 21 determines whether the connection to controller 24 is available (step 62). When neither the connection to the central office terminal 26 nor the connection to controller 24, only local calls can be completed. In this isolation situation, remote terminal 21 determines whether a call request is to another local subscriber 27a–n connected to remote terminal 21 (step 56). Call requests to other local subscriber 27a–n can be completed within remote terminal 21 (step 58). If the call request is not to another local subscriber 27a–n, remote terminal 21 indicates to the subscriber, as before, that service is not available.

If the connection to central office terminal 26 is unavailable but the connection to controller 24 is available, the remote terminal determines whether the call request is to another local subscriber 27a–n connected to remote terminal 21 (step 64). Call requests to other local subscriber 27a–n can be completed within remote terminal 21 (step 66). If the call request is not to another local subscriber 27a–n, the terminal determines whether an alternate route, e.g., a connection to remote terminals 23 or 25, through which the call request can be completed exists (step 68). If an alternate route exists, the call will be completed through the alternate route (step 70). However, if an alternate route does not exists, remote terminal 21 will indicate to the subscriber that service is not available.

Other implementations are within the scope of the following claims.

What is claimed is:

1. A method of switching subscriber calls comprising:
   receiving a subscriber call request on an access terminal;
   determining whether the access terminal is in communication with a telecommunications network;
   determining whether the access terminal is in communication with a controller connected to the telecommunications network;
   routing the subscriber call request to an alternate telecommunications terminal if the access terminal is in communication with the controller but not in communication with the telecommunications network;
   receiving the subscriber call request at the alternate telecommunications terminal;
   determining if the alternate telecommunications terminal is in communication with the telecommunications network; and
   routing the subscriber call to the telecommunications network if the alternate access terminal is in communication with the telecommunications network and the call is to a subscriber not connected to the alternate access terminal.

2. The method of claim 1 further comprising:
   determining whether the subscriber call is to another subscriber connected to the access terminal;
   switching the subscriber call within the access terminal to another subscriber connected to the access terminal if the subscriber call request is determined to be to another subscriber connected to the access terminal.

3. The method of claim 1 wherein the access terminal comprises a remote terminal and the alternate telecommunications terminal comprises a central office terminal.

4. The method of claim 1 further comprising:
   indicating that service is not available to subscribers not connected to the access terminal, if the access terminal is not in communication with the controller of the telecommunications network.

5. The method of claim 1 further comprising recording subscriber calls and call attempts while the access terminal is not in communication with the telecommunications network.

6. The method of claim 1 further comprising providing at least some central office functionality while the access terminal is not in communication with the telecommunications network.

7. The method of claim 6, wherein the providing of at least some central office functions is performed by a resource card with a digital signal processor.

8. A telecommunications network comprising:
   a plurality of access terminals connected to a local switching network;
   a controller connected to the local switching network and to the plurality of access terminals; and
   a processor in at least one of the access terminals for (i) routing subscriber calls through the switching network when the communication link between the access terminal and the switching network is functioning and (ii) routing subscriber calls through another access terminal connected to the access terminal and the switching network when the communication link between the access terminal and the switching network is malfunctioning and the link from the access terminal to the controller is functioning.

9. The telecommunications network of claim 8 wherein the processor in at least one of the access terminals is further for (iii) routing subscriber calls to other subscribers on the same access terminal.

10. The telecommunications network of claim 8 wherein the processor indicates that service is not available to subscribers not connected to the access terminal when the communication link between the access terminal and the controller is malfunctioning.

11. The telecommunications network of claim 8 wherein the processor further records subscriber calls and call attempts while the communication link between the access terminal and the controller is malfunctioning.

12. The telecommunications network of claim 8 wherein the processor further records subscriber calls and call attempts while the communication link between the access terminal and the switching network is malfunctioning.

13. The telecommunications network of claim 8 wherein the processor further provides at least some central office functionality while the communication link between the access terminal and the controller is malfunctioning.

14. The telecommunications network of claim 8 wherein the processor further provides at least some central office functionality while the communication link between the access terminal and the switching network is malfunctioning.

15. Software, residing on a computer-readable medium, for an access terminal in a telecommunications network comprising a plurality of access terminals connected to a switching network and a controller connected to the switching network and the access terminals, the software comprising instructions to cause one or more processors to perform the following operations:

determine whether a communications link between the access terminal and the switching network is malfunctioning;

determine whether a communications link between the access terminal and controller connected to the switching network is functioning; and     route subscriber calls to an alternate access terminal connected to the access terminal and the switching network when the communications link between the access terminal and the switching network is determined to be malfunctioning and the link from the access terminal to the controller is functioning.

16. The software of claim 15 further comprising instructions to:

route subscriber calls within the access terminal to other subscribers connected to the access terminal.

17. The software of claim 15 further comprising instructions to:

determine whether a communications link between the access terminal and the controller is malfunctioning; and     indicate that service is not available to other subscribers not connected to the access terminal.

18. The software of claim 15 further comprising instructions to record subscriber calls and call attempts while the communication link between the access terminal and the controller is malfunctioning.

19. The software of claim 15 further comprising instructions to record subscriber calls and call attempts while the communication link between the access terminal and the switching network is malfunctioning.

20. The software of claim 15 further comprising instructions to provide at least some central office functionality while the communication link between the access terminal and the controller is malfunctioning.

21. The software of claim 15 further comprising instructions to provide at least some central office functionality while the communication link between the access terminal and the switching network is malfunctioning.

* * * * *